United States Patent
Ozaki et al.

(10) Patent No.: US 9,577,237 B2
(45) Date of Patent: Feb. 21, 2017

(54) INORGANIC OXIDE POWDER, INORGANIC OXIDE-CONTAINING SLURRY, LITHIUM ION SECONDARY BATTERY USING SAID SLURRY, AND PRODUCTION METHOD THEREFOR

(71) Applicant: SUMITOMO CHEMICAL COMPANY, LIMITED, Chuo-ku, Tokyo (JP)

(72) Inventors: Hirotaka Ozaki, Niihama (JP); Yasuharu Kobashi, Niihama (JP); Ken Shimada, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 93 days.

(21) Appl. No.: 14/371,203

(22) PCT Filed: Jan. 18, 2013

(86) PCT No.: PCT/JP2013/050954
§ 371 (c)(1),
(2) Date: Jul. 9, 2014

(87) PCT Pub. No.: WO2013/108883
PCT Pub. Date: Jul. 25, 2013

(65) Prior Publication Data
US 2015/0004465 A1    Jan. 1, 2015

(30) Foreign Application Priority Data
Jan. 20, 2012  (JP) .................................. 2012-010227

(51) Int. Cl.
| H01M 2/16 | (2006.01) |
| H01M 4/139 | (2010.01) |
| H01M 2/34 | (2006.01) |
| H01M 2/14 | (2006.01) |
| H01M 4/04 | (2006.01) |
| H01M 10/0525 | (2010.01) |
| C01F 7/36 | (2006.01) |
| C01F 7/44 | (2006.01) |
| H01M 10/052 | (2010.01) |

(52) U.S. Cl.
CPC .............. *H01M 2/1686* (2013.01); *C01F 7/36* (2013.01); *C01F 7/441* (2013.01); *H01M 2/145* (2013.01); *H01M 2/1646* (2013.01); *H01M 2/348* (2013.01); *H01M 4/0416* (2013.01); *H01M 4/139* (2013.01); *H01M 10/0525* (2013.01); *C01P 2004/62* (2013.01); *C01P 2006/10* (2013.01); *C01P 2006/12* (2013.01); *C01P 2006/80* (2013.01); *H01M 2/1673* (2013.01); *H01M 10/052* (2013.01); *H01M 2220/20* (2013.01); *H01M 2220/30* (2013.01)

(58) Field of Classification Search
CPC .... H01M 2/16; H01M 2/1646; H01M 2/1686; H01M 2/145; H01M 4/0416; H01M 4/139
See application file for complete search history.

(56) References Cited

U.S. PATENT DOCUMENTS

| 2004/0166407 A1* | 8/2004 | Nakajima et al. ............ 429/217 |
| 2005/0214201 A1 | 9/2005 | Maruno et al. |
| 2006/0105245 A1 | 5/2006 | Ikuta et al. |
| 2007/0042270 A1 | 2/2007 | Ohata et al. |
| 2007/0117025 A1 | 5/2007 | Ikuta et al. |
| 2008/0070107 A1 | 3/2008 | Kasamatsu et al. |
| 2008/0274399 A1 | 11/2008 | Ohata et al. |
| 2009/0061313 A1 | 3/2009 | Tadano |
| 2009/0123363 A1 | 5/2009 | Maruno et al. |
| 2010/0040535 A1 | 2/2010 | Azima et al. |
| 2010/0167055 A1 | 7/2010 | Ozaki et al. |
| 2010/0178544 A1* | 7/2010 | Nishikawa .................... 429/129 |
| 2011/0039145 A1 | 2/2011 | Abe et al. |
| 2011/0045338 A1 | 2/2011 | Bae et al. |
| 2011/0189546 A1 | 8/2011 | Ikeda |
| 2011/0206963 A1 | 8/2011 | Fujita et al. |

FOREIGN PATENT DOCUMENTS

| CN | 1669933 A | 9/2005 |
| CN | 1788371 A | 6/2006 |

(Continued)

OTHER PUBLICATIONS

Machine translation of JP 2011-216257, published on Oct. 27, 2011.*
Machine translation of TW 200950182, published on Dec. 1, 2009.*
Machine translation of CN 1806351 A, published on Jul. 19, 2006.*
Machine translation of KR 10-2011-0097725, published on Aug. 31, 2011.*
Machine translation of KR 10-2007-0067703, published on Jun. 28, 2007.*
International Preliminary Report on Patentability issued Jul. 22, 2014 in International Application No. PCT/JP2013/050954.
International Search Report mailed Apr. 16, 2013 in International Application No. PCT/JP2013/050954.

(Continued)

*Primary Examiner* — Anca Eoff
(74) *Attorney, Agent, or Firm* — Sughrue Mion, PLLC

(57) ABSTRACT

An object of the present invention is to provide an inorganic oxide powder suitable for forming an inorganic oxide porous membrane, which is superior in lithium ion conductivity and has insulation performance, on at least one surface of a positive electrode, a negative electrode and a separator which constitute a lithium ion secondary battery. The present invention relates to an inorganic oxide powder for use in forming an inorganic oxide porous membrane having insulation performance on at least one surface of a positive electrode, a negative electrode and a separator which constitute a lithium ion secondary battery, wherein the powder has 1) an oxide purity of 90% by weight or higher; 2) an average particle diameter of 1 μm or less; and 3) an average three-dimensional particle unevenness of 3.0 or higher.

6 Claims, 1 Drawing Sheet

(56) References Cited

FOREIGN PATENT DOCUMENTS

| | | | |
|---|---|---|---|
| CN | 1806351 | A | 7/2006 |
| CN | 101378135 | A | 3/2009 |
| CN | 101759216 | A | 6/2010 |
| CN | 102177604 | A | 9/2011 |
| CN | 102190323 | A | 9/2011 |
| EP | 1 734 600 | A1 * | 12/2006 |
| JP | 2-68807 | A | 3/1990 |
| JP | 09-147916 | A | 6/1997 |
| JP | 2005-222780 | A | 8/2005 |
| JP | 2005-235695 | A | 9/2005 |
| JP | 2005-327680 | A | 11/2005 |
| JP | 2008-100903 | A | 5/2008 |
| JP | 2009-32677 | A | 2/2009 |
| JP | 2009-54455 | A | 3/2009 |
| JP | 2010-150090 | A | 7/2010 |
| JP | 2011-216257 | * | 10/2011 |
| KR | 1020070067703 | A | 6/2007 |
| KR | 1020110097725 | A | 8/2011 |
| TW | 200950182 | A1 | 12/2009 |
| WO | 2006/061936 | A1 | 6/2006 |
| WO | 2010/041556 | A1 | 4/2010 |
| WO | 2011/063132 | A1 | 5/2011 |

OTHER PUBLICATIONS

Communication dated Sep. 22, 2015 from the European Patent Office in counterpart application No. 13738268.5.

Communication dated Sep. 28, 2015 from the State Intellectual Property Office of the P.R.C. in counterpart application No. 201380005971.9.

Communication dated Mar. 4, 2016 from the State Intellectual Property Office of the P.R.C issued in corresponding Application No. 201380005971.9.

Communication dated Jul. 19, 2016 from the Taiwanese Intellectual Property Office in counterpart Application No. 102101976.

Communication dated Sep. 28, 2016, issued by the Korean Intellectual Property Office in corresponding Korean Application No. 10-2014-7019979.

* cited by examiner

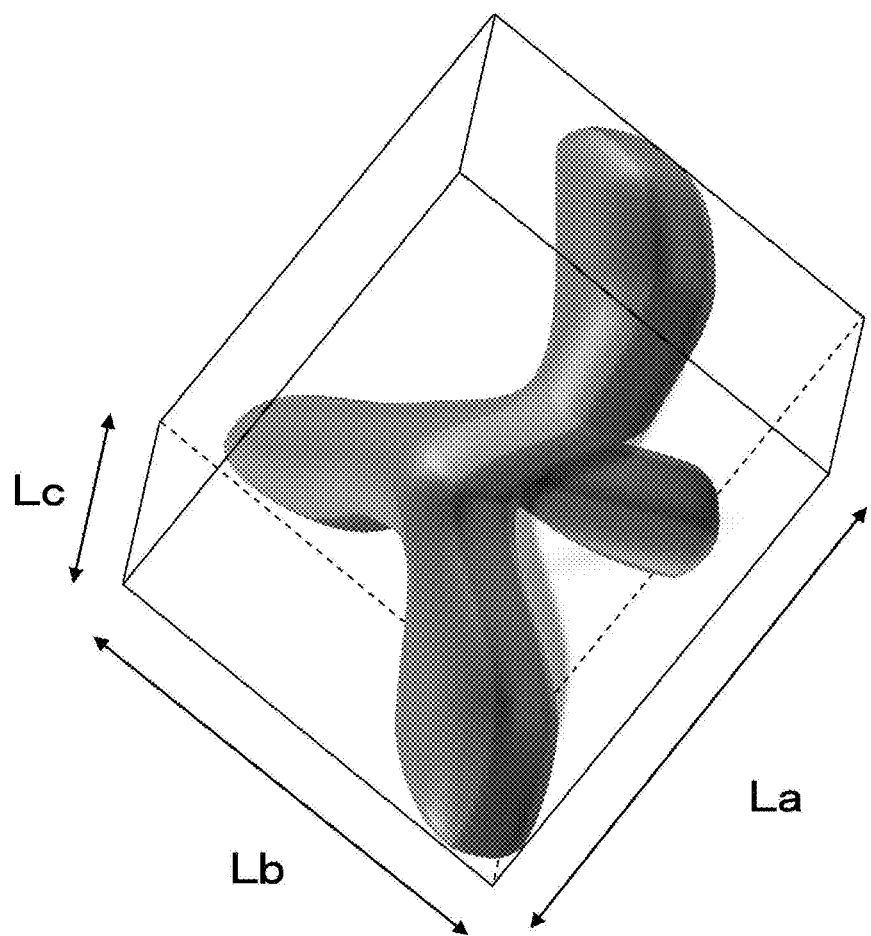

INORGANIC OXIDE POWDER, INORGANIC OXIDE-CONTAINING SLURRY, LITHIUM ION SECONDARY BATTERY USING SAID SLURRY, AND PRODUCTION METHOD THEREFOR

CROSS REFERENCE TO RELATED APPLICATIONS

This application is a National Stage of International Application No. PCT/JP2013/050954 filed Jan. 18, 2013, claiming priority based on Japanese Patent Application No. 2012-010227 filed Jan. 20, 2012, the contents of all of which are incorporated herein by reference in their entirety.

TECHNICAL FIELD

The present invention relates to an inorganic oxide powder for use in forming an inorganic oxide porous membrane having insulation performance on at least one surface of a positive electrode, a negative electrode and a separator which constitute a lithium ion secondary battery. In addition, the present invention relates to a slurry containing this inorganic oxide powder, and also to a lithium ion secondary battery in which this slurry is used and a process for producing the same.

BACKGROUND ART

Since a lithium ion secondary battery has a high energy density, the battery is used in compact devices for consumers such as mobile phones and personal computers, and recently, its application in not only these compact devices but also in automobiles has been accelerated.

A lithium ion secondary battery generally has a positive electrode and a negative electrode, and additionally it is conventional to place a separator for the purpose of electrical insulation between these electrodes. As a separator for a lithium ion secondary battery, for example, a microporous sheet made of a polyolefin-based resin is used.

The separator made of the microporous sheet plays a role in maintaining safety of a lithium ion secondary battery, when a short circuit takes place inside the battery, by closing a pore of the separator due to a shutdown function of the separator so as to prevent a lithium ion movement at the short circuit part and accordingly eliminating a battery function of the short circuit part. However, when a battery temperature is, for example, over 150° C. due to momentarily generated heat, the separator may drastically contract and the short circuit part between a positive electrode and a negative electrode may expand. In this case, a battery temperature may reach an abnormally overheated state of several hundred degrees centigrade or higher, and therefore, there is a problem in safety.

Thus, as a means to solve the aforementioned problem, a technique is suggested in Patent Literature 1, where an inorganic oxide porous membrane which contains an inorganic oxide filler having insulation performance is formed on a surface of a positive electrode, a negative electrode or a separator constituting a lithium ion secondary battery.

In addition, Patent Literature 2 discloses a lithium ion secondary battery which has a porous membrane having a thickness of from 0.5 to 20 μm obtained by using highly heat resistant α-alumina particles having an average particle diameter of from 0.1 to 5 μm as an inorganic oxide filler for use in such an inorganic oxide porous membrane.

CITATION LIST

Patent Literature

Patent Literature 1: JP 9-147916 A
Patent Literature 2: JP 2005-222780 A

SUMMARY OF INVENTION

Problems to be Solved by the Invention

The inorganic oxide porous membranes disclosed in the aforementioned patent literatures have high heat resistance and superior dimension stability, and therefore, the membranes can suppress drastic contraction of a separator.

However, even when an inorganic oxide membrane is prepared using the inorganic oxide powder satisfying various properties such as a BET specific surface area, an average particle diameter and the like described in these patent literatures, an average pore radius and porosity of the obtained inorganic oxide porous membrane is insufficient, and ion permeability is insufficient, and as a result, there was a problem that a lithium secondary battery containing the inorganic oxide porous membrane has an insufficient load characteristic.

The inorganic oxide powder disclosed thus in the aforementioned patent literatures was not necessarily satisfactory as a powder for forming an inorganic porous membrane of a lithium ion secondary battery.

Under such circumstances, an object of the present invention is to provide an inorganic oxide powder suitable for forming an inorganic porous membrane having an average pore radius and porosity which can provide at least one surface of a positive electrode, a negative electrode and a separator which constitute a lithium ion secondary battery with sufficient ion permeability, and having superior heat resistance and insulation performance.

Means for Solving the Problem

As a result of inventive studies to solve the aforementioned problem, the inventors found that a shape (three-dimensional particle unevenness) of an inorganic oxide powder constituting an inorganic oxide porous membrane greatly affects an average pore radius and porosity of the obtained inorganic oxide porous membrane. In addition, they have found that the following invention is suitable for the aforementioned object, and completed the present invention.

That is, the present invention provides the followings.

[1] An inorganic oxide powder for use in forming an inorganic oxide porous membrane having insulation performance on at least one surface of a positive electrode, a negative electrode and a separator which constitute a lithium ion secondary battery, characterized in that the powder has
1) an oxide purity of 90% by weight or higher,
2) an average particle diameter of 1 μm or less, and
3) an average three-dimensional particle unevenness of 3.0 or higher.

[2] The inorganic oxide powder according to the above [1], wherein the powder contains 5% or more of particles having a three-dimensional particle unevenness of higher than 4.0, based on the number of entire particles constituting the inorganic oxide powder.

[3] The inorganic oxide powder according to the above [1] or [2], wherein the powder has a BET specific surface area of 1 $m^2$/g or more and 20 $m^2$/g or less.

[4] The inorganic oxide powder according to any one of the above [1] to [3], wherein the inorganic oxide is α-alumina.

[5] An inorganic oxide slurry characterized in that the slurry contains the inorganic oxide powder as defined in any one of the above [1] to [4], a binder and a solvent.

[6] A process for producing a lithium ion secondary battery, characterized in that the process comprises a step of coating the inorganic oxide slurry as defined in the above [5] on a surface of a positive electrode and/or a negative electrode, followed by drying the slurry to form an inorganic oxide porous membrane.

[7] A process for producing a lithium ion secondary battery, characterized in that the process comprises a step of coating the inorganic oxide slurry as defined in the above [5] on a surface of a separator, followed by drying the slurry to form an inorganic oxide porous membrane.

[8] A lithium ion secondary battery characterized in that the battery is produced by the process as defined in the above [6] or [7].

Effects of the Invention

According to the present invention, an inorganic oxide porous membrane suitable for forming an inorganic oxide porous membrane having an average pore radius and porosity which can provide sufficient ion permeability, and having superior heat resistance and insulation performance is provided. Since an inorganic oxide porous membrane formed of the aforementioned inorganic oxide powder has superior lithium ion conductivity, a lithium ion secondary battery having the inorganic oxide membrane on at least one surface of a positive electrode, a negative electrode and a separator is superior in load characteristic.

BRIEF DESCRIPTION OF DRAWINGS

FIG. 1 shows a diagram for illustrating a three-dimensional particle unevenness.

DESCRIPTION OF EMBODIMENTS

Hereinafter, the present invention will be explained in detail. When the expression "to" is used for a range of value, the range contains the upper and lower limits.

The present invention relates to an inorganic oxide powder (may be referred hereinafter to as "the inorganic oxide powder of the present invention" or simply "the inorganic oxide powder") for use in forming an inorganic oxide porous membrane having insulation performance on at least one surface of a positive electrode, a negative electrode and a separator which constitute a lithium ion secondary battery, wherein the powder has
1) an oxide purity of 90% by weight or higher,
2) an average particle diameter of 1 μm or less, and
3) an average three-dimensional particle unevenness of 3.0 or higher.

The inorganic oxide powder of the present invention is not particularly limited, as long as the powder has insulation performance. As its oxide component, aluminum oxide, titanium oxide, magnesium oxide, silicon oxide or the like may be used. These may be used alone or in combination of two or more.

Among them, aluminum oxide (alumina) is preferable, and α-alumina, which is superior in insulation performance and heat resistance and is chemically stable, is particularly preferable.

The inorganic oxide powder of the present invention has an oxide purity of 90% by weight or higher, preferably of 99% by weight or higher, more preferably of 99.9% by weight or higher, and the most preferably of 99.99% by weight or higher.

Here, the "oxide purity" means a proportion of an oxide component as a standard when the sum of entire components in the inorganic oxide powder of the present invention is 100% by weight. Its measurement is described later in Examples using an example where an oxide component as a standard is α-alumina.

In particular, in the case where the inorganic oxide powder of the present invention is an α-alumina powder, when its purity is under 90% by weight, impurities contained in the α-alumina powder such as Si, Na, Fe or the like increase, and good electrical insulation performance cannot be obtained, and furthermore, a mixed amount of metallic foreign matters causing a short circuit increases, and therefore, such a purity is not preferable.

One of the features of the inorganic oxide powder of the present invention is that a shape (three-dimensional particle unevenness) of inorganic oxide particles constituting the inorganic oxide powder is within a certain range.

Here, the "three-dimensional particle unevenness" is a shape parameter for one of the inorganic oxide particles constituting an inorganic oxide powder, and is a value defined according to the following formula (1), based on a particle volume V ($\mu m^3$) and a volume of a cuboid adjacent to the particle, La×Lb×Lc ($\mu m^3$). In addition, the "average three-dimensional particle unevenness (of a powder)" is an average value of a three-dimensional particle unevenness calculated according to formula (1) for any 100 or more of inorganic oxide particles contained in a powder.

$$\text{Three-dimensional particle unevenness} = La \times Lb \times Lc / V \quad (1)$$

wherein La denotes the longest particle diameter,
Lb denotes the medium particle diameter,
Lc denotes the shortest particle diameter, and
La, Lb and Lc are at right angles to each other. FIG. 1 shows a diagram for illustrating a three-dimensional particle unevenness.

The aforementioned particle volume V, and longest particle diameter La, medium particle diameter Lb and shortest particle diameter Lc of a particle can be determined by analyzing a continuous slice image of a targeted particle by means of a three-dimensional quantitative analysis software (such as TRI/3D-PRT manufactured by RATOC SYSTEM ENGINEERING).

In addition, the continuous slice image of a particle can be obtained by slicing an evaluation sample, which has been obtained by curing a resin for particle immobilization (such as an epoxy resin) with a certain amount of a dispersed inorganic oxide powder, at a certain interval in a FIB processing, repeatedly capturing cross-sectional SEM images to obtain certain number of cross-sectional SEM images, and subsequently synthesizing the obtained cross-sectional SEM images by means of a suitable image analysis software (such as Avizo ver. 6.0 manufactured by Visualization Sciences Group).

A specific evaluation procedure of a three-dimensional particle unevenness (a method for producing a sample for a continuous slice image, and a method for determining V, La, Lb and Lc with a three-dimensional quantitative analysis software) will be described in detail in Examples using an alumina particle as an example in Examples.

An average three-dimensional particle unevenness of the inorganic oxide powder of the present invention, which is defined in the aforementioned method, is 3.0 or higher, and preferably 3.5 or higher. In addition, the upper limit of the average three-dimensional particle unevenness is preferably 10.0 or lower, and more preferably 6.0 or lower.

When an average three-dimensional particle unevenness is lower than 3.0, an inorganic oxide porous membrane decreases in its porosity, which membrane is obtained by making an inorganic oxide powder into a slurry, coating the slurry on a surface of an electrode mixture layer containing an electrode active material (a positive electrode active material or negative electrode active material) and a binder, and drying the slurry. Thus, an amount of an electrolysis solution retained in the inorganic oxide porous membrane decreases, and therefore, such an unevenness is not preferable. On the other hand, when an average three-dimensional particle unevenness is higher than 10.0, the inorganic oxide porous membrane composed of the inorganic oxide powder of the present invention may increase in its porosity, which membrane is obtained by making the inorganic oxide powder of the present invention into a slurry, coating the slurry on a surface of an electrode (a positive or negative electrode) composed of an electrode mixture layer containing an electrode active material and a binder, and drying the slurry. As a result, the inorganic oxide porous membrane may decrease in its strength.

The inorganic oxide powder of the present invention preferably contains 5% or more, and more preferably 20% or more of particles having a three-dimensional particle unevenness of higher than 4.0, based on the number of entire particles constituting the inorganic oxide powder. When a proportion of the number of the particles having a three-dimensional particle unevenness of higher than 4.0 is in the aforementioned range, a porosity of an inorganic oxide porous membrane is in a suitable range, which membrane is obtained by making an inorganic oxide powder into a slurry, coating the slurry on a surface of an electrode mixture layer containing an electrode active material and a binder, and drying the slurry. Then, an amount of an electrolysis solution retained in the inorganic oxide porous membrane and strength of the inorganic oxide porous membrane will be suitable. The upper limit of a proportion of the number of particles having a three-dimensional particle unevenness of higher than 4.0 contained in the inorganic oxide powder of the present invention is not particularly limited, but it is generally 90% or lower.

As an oxide component of the inorganic oxide powder of the present invention, α-alumina is suitable. In the case where the inorganic oxide powder of the present invention is α-alumina, when an α-alumina powder, a binder and solvent are mixed to prepare an α-alumina slurry and the α-alumina slurry is coated on a surface of a positive or negative electrode composed of an electrode mixture layer containing an electrode active material, or on a surface of a separator to form a coated film and a consolidation processing such as milling is carried out, a porosity and pore radius of α-alumina suitable for lithium ion conductivity can be sufficiently ensured, and at the same time, a porosity can be arbitrarily controlled in a preferable range, and therefore, α-alumina is preferable.

An average particle diameter of the inorganic oxide powder of the present invention is 1 μm or less. The "average particle diameter" defined here means a particle diameter corresponding to 50% cumulative percentage on a mass basis measured by a laser diffraction method.

In addition, its BET specific surface area is preferably 1 $m^2/g$ or more and 20 $m^2/g$ or less, more preferably 1 $m^2/g$ or more and 10 $m^2/g$ or less, and further preferably 1 $m^2/g$ or more and 5 $m^2/g$ or less. When the BET specific surface area is in the aforementioned range, an adsorbed moisture content decreases, and therefore, when an inorganic oxide porous membrane is prepared and a lithium ion secondary battery is produced in the following method, bubble generation due to moisture is reduced, and a battery with high safety can be obtained.

Methods for measuring an average particle diameter and a BET specific surface area are described later in Examples using α-alumina as an example.

A method for producing an α-alumina powder suitable for the inorganic oxide powder of the present invention is not particularly limited, but examples of the method for producing an α-alumina powder include a method to calcine aluminum hydroxide produced in an aluminum alkoxide method; a synthesizing method using an organic aluminum; a method to calcine a raw material with transition alumina or an alumina powder which changes to transition alumina by heat treating in an atmosphere gas having hydrogen chloride; a method described in JP 2010-150090 A, JP 2008-100903 A, JP 2002-047009 A, JP 2001-354413 A, or the like.

Examples of the aluminum alkoxide method include a method for obtaining aluminum hydroxide in the form of a dry powder by hydrolyzing aluminum alkoxide with water to obtain aluminum hydroxide in the form of slurry, sol, or gel, and drying the aluminum hydroxide.

Aluminum hydroxide in the form of a powder obtained by drying is a bulky powder generally having an untamped density of from about 0.1 to 0.4 $g/cm^3$, and preferably from 0.1 to 0.2 $g/cm^3$.

A cumulative pore volume (pore radius is in a range of from 0.01 μm to 1 μm) of aluminum hydroxide is not particularly limited, but a cumulative pore volume of 0.6 mL/g or more is preferable. In this case, since aluminum hydroxide has a small primary particle and is superior in dispersibility, and there are a small amount of agglomerated particles, the alumina calcined body obtained by calcination can be free from generation of firmly bonded alumina agglomerated particles which can be hardly pulverized.

The targeted α-alumina powder can be obtained by calcination of aluminum hydroxide in the form of a dry powder obtained by an aluminum alkoxide method.

Calcination of aluminum hydroxide is generally carried out in a calcination vessel in which the aluminum hydroxide is introduced. Examples of a calcination vessel include a sheath.

In view of preventing contamination of the obtained an α-alumina powder, material of a calcination vessel is preferably alumina, and particularly α-alumina with a high purity.

A method for introducing aluminum hydroxide in a calcination vessel is not particularly limited, but it is preferable to introduce aluminum hydroxide under its own weight and not to compression-fill aluminum hydroxide in excess.

Examples of a calcination furnace for calcining aluminum hydroxide include a material stationary-type calcination furnace represented by a tunnel kiln, a batch-type air flow-type box-type calcination furnace, a batch-type air co-flow-type box-type calcination furnace or the like; a rotary kiln and the like.

Calcination temperature of aluminum hydroxide, rate of temperature increase to the calcination temperature and calcination time are appropriately selected in order that α-alumina having desired properties is obtained.

Calcination temperature of aluminum hydroxide is, for example, 1100° C. or higher and 1450° C. or lower, and preferably 1200° C. or higher and 1350° C. or lower. Rate of temperature increase to this calcination temperature is generally 30° C./hour or higher and 500° C./hour or lower. Calcination time of aluminum hydroxide is generally 0.5 hours or more and 24 hours or less, and preferably 1 hour or more and 10 hours or less.

Calcination of aluminum hydroxide may be carried out not only in an air atmosphere but also in an atmosphere of an inert gas such as nitrogen gas and argon gas, and may be also carried out in an atmosphere having a high water vapor partial pressure as in a gas furnace for calcination by burning of propane gas or the like.

The obtained α-alumina powder may be aggregated in a state that an average particle diameter is more than 10 μm. In this case, it is preferable to pulverize the powder so that the powder has an average particle diameter of 1 μm or less.

Pulverization of an α-alumina powder can be carried out by means of a known apparatus such as a vibration mill, ball mill and jet mill, and both a pulverizing method in a dry state and a pulverizing method in a wet state can be employed. However, in order that a purity is maintained, that a coarse particle is not contained, and that the aforementioned properties are achieved, a pulverizing method with maintaining a purity, for example, a pulverization by means of a jet mill is a preferable method.

A content of a coarse particle having a particle diameter of 10 μm or more contained in the obtained α-alumina powder is preferably 10 ppm or less, and more preferably 3 ppm or less. When a content of a coarse particle is in the aforementioned range, a uniform inorganic oxide porous membrane can be obtained, and porosity reduction due to a coarse particle can be suppressed, and a porous membrane having high porosity can be obtained.

An average particle diameter of an α-alumina powder can be determined, for example, by an evaluation method described in Examples.

When 5% cumulative percentage and 100% cumulative percentage on a mass basis from the smaller side of a particle diameter distribution are d5 and d100, respectively, [(d100−d5)/average particle diameter] is preferably 30 or less, further preferably 10 or less, and most preferably 5 or less. In this case, variation of a particle diameter becomes small, and a uniform inorganic oxide porous membrane can be obtained.

As to a pulverization apparatus, its surface contact with α-alumina is preferably constituted of α-alumina material with high purity or lined with resin, in view that contamination of the obtained α-alumina powder is reduced.

When pulverization takes place using a medium stirring mill or the like, the pulverization medium to be used is preferably constituted of α-alumina material with high purity.

The inorganic oxide slurry of the present invention comprises the aforementioned inorganic oxide powder of the present invention, a binder and a solvent. As a binder, a known binder can be used, and specific examples thereof include fluorine resins such as polyvinylidene fluoride (PVDF), polytetrafluoroethylene (PTFE), and tetrafluoroethylene-hexafluoropropylene copolymer (FEP); polyacrylic acid derivatives such as polyacrylic acid, polymethyl acrylate ester, polyethyl acrylate ester, and polyhexyl acrylate ester; polymethacrylic acid derivatives such as polymethacrylic acid, polymethyl methacrylate ester, polyethyl methacrylate ester, and polyhexyl methacrylate ester; polyamides, polyimides, polyamide-imides, polyvinyl acetate, polyvinyl pyrrolidone, polyethers, polyether sulfones, hexafluoropolypropylene, styrene-butadiene rubber, carboxymethylcellulose, polyacrylonitrile and the derivatives thereof, polyethylene, polypropylene, aramid resin, and the like.

Additionally, a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid and hexadiene can be also used.

As a solvent, a known solvent can be used, and specific examples thereof include water, acetone, tetrahydrofuran, methylene chloride, chloroform, dimethylformamide, N-methyl-2-pyrrolidone (NMP), cyclohexane, xylene, cyclohexanone and a mixture of these.

Additionally, a known thickener can be also used for the purpose of giving an inorganic oxide slurry a viscosity suitable for coating.

The content of a binder in the inorganic oxide slurry of the present invention is not particularly limited, but, for example, the content is preferably from 0.1 to 20 parts by weight, based on 100 parts by weight of the inorganic oxide powder of the present invention. The content of a solvent in the inorganic oxide slurry of the present invention is not particularly limited, but, for example, the content is preferably from 10 to 500 parts by weight, based on 100 parts by weight of the inorganic oxide powder of the present invention.

The inorganic oxide slurry of the present invention can be prepared by mixing and dispersing the inorganic oxide powder of the present invention, a binder and a solvent. The dispersing method of the inorganic oxide slurry is not particularly limited, and a stirring method with a known planetary mixer or a dispersing method with ultrasound irradiation can be used. In this case, a lower viscosity at a shear rate of 100 $S^{-1}$ of the slurry leads better workability in a step such as dispersing, mixing and transporting.

An inorganic oxide porous membrane produced from the inorganic oxide slurry obtained in this way has high heat resistance and insulation performance. This inorganic oxide porous membrane is suitably used in a lithium ion secondary battery which comprises a battery group (laminate-type battery group) produced by forming the membrane on at least one surface of a positive electrode, a negative electrode or a separator and laminating the membrane together with a positive electrode, a negative electrode and a separator, or an electrode group (wound-type battery group) produced by laminating and winding the inorganic oxide porous membrane together with a positive electrode, a negative electrode and a separator, and an electrolysis solution.

Preferable examples of a method for producing such a lithium ion secondary battery include a production method comprising a step of forming an inorganic oxide porous membrane by coating the aforementioned inorganic oxide slurry on a surface of a positive electrode and/or negative electrode comprising an electrode mixture layer containing an electrode active material (a positive electrode active material or negative electrode active material) and a binder and drying the slurry. In addition, a production method comprising a step of forming an inorganic oxide porous membrane by coating the aforementioned inorganic oxide slurry, not on a surface of a positive electrode and/or a negative electrode, but on a surface of a separator, and drying the slurry, may be also used.

As a more specific production method, for example, in the case of a method for producing a lithium ion secondary battery containing a wound-type battery group where an inorganic oxide porous membrane is formed on a negative electrode, there may be a process where one end of a negative electrode lead is connected to a negative electrode lead connection part on whose surface an inorganic oxide porous membrane is applied, and where the other end of the negative electrode lead is connected to a positive electrode lead connection part, and a positive electrode and a negative electrode are laminated via a separator and are wound to constitute a wound-type battery group, and this electrode group is stored in a battery can in a state that the group is interposed between the upper and lower insulating rings, and the battery can is closed with a battery lid after introduction of an electrolysis solution.

A method for coating the aforementioned inorganic oxide slurry on a surface of an electrode mixture layer containing a positive or negative electrode active material and a binder or on a surface of a separator is not particularly limited, and for example, a known doctor blade method, gravure printing method or the like can be used. Also, a drying method is not particularly limited, and a known hot-air drying, vacuum drying or the like can be used. The inorganic oxide porous membrane obtained then preferably has a thickness of from about 1 to 50 μm, and more preferably from about 2 to 10 μm.

Materials constituting a battery, such as a positive electrode, a negative electrode, a separator, an electrolysis solution or the like in a lithium ion secondary battery, are not particularly limited, and conventionally known materials can be used. For example, a material disclosed in a publication such as WO 09/041722 can be used.

A lithium ion secondary battery of the present invention produced in the aforementioned method contains an inorganic oxide porous membrane composed of the inorganic oxide powder of the present invention.

An average pore radius of the inorganic oxide porous membrane is preferably from 0.05 to 0.50 μm, and more preferably from 0.07 to 0.20 μm. In addition, a porosity of the inorganic oxide porous membrane is preferably from 30 to 80% by volume, and more preferably from 30 to 60% by volume.

When an average pore radius and porosity satisfy the aforementioned ranges, the inorganic oxide porous membrane has sufficient ion permeability and has superior heat resistance and insulation performance, and therefore, a lithium ion secondary battery having such an inorganic oxide porous membrane has a superior load characteristic, and superior heat resistance and dimension stability even at a shutdown temperature of a separator.

A method for calculating an average pore radius and porosity of an inorganic oxide porous membrane is described later in Examples using alumina porous membrane as an example.

EXAMPLES

The present invention will be described in detail by way of example, but the present invention is not limited to the examples. Evaluation methods of various properties are as follows.

(Oxide Purity)

Contents of Si, Na, Mg, Cu and Fe were measured by means of solid emission spectroscopic method.

As an oxide purity, the value obtained by subtracting the sum (%) of the weight of $SiO_2$, $Na_2O$, MgO, CuO and $Fe_2O_3$ contained in a standard oxide (α-alumina) from 100 was used. $SiO_2$, $Na_2O$, MgO, CuO and $Fe_2O_3$ are defined as impurities. A calculation formula is as follows;

Oxide purity (% by weight)=100−[sum of the weight of impurities](% by weight).

(BET Specific Surface Area)

As a device for measuring a specific surface area, "Flow-Sorb II 2300" manufactured by Shimadzu Corporation was used, and a BET specific surface area was determined in nitrogen absorption method one-point method according to the method specified in JIS-Z-8830.

(Particle Diameter)

An average particle diameter was determined as a particle diameter corresponding to 50% cumulative percentage on a mass basis measured in a laser diffraction method by means of a laser-type particle diameter distribution measuring apparatus ("Microtrac" manufactured by NIKKISO CO., LTD.). In addition, particle diameters corresponding to 5% cumulative percentage and 100% cumulative percentage on a mass basis from the smaller side of a particle diameter distribution were defined as d5 and d100, respectively. In a measurement, ultrasonic dispersion was carried out with 0.2% by weight of sodium hexametaphosphate aqueous solution so that refractive index was 1.76.

(Average Three-Dimensional Particle Unevenness)

Two parts by weight of a dispersing agent and 2 parts by weight of an alumina particle powder were dispersed in 100 parts by weight of an epoxy resin, and after vacuum deaeration, 12 parts by weight of a curing agent was added to obtain an alumina-dispersed epoxy resin, and the resin was poured into a silicone mold and cured.

After the cured sample was held in a sample holder, carbon deposition was carried out. The sample was placed in FIB-SEM [(HELIOS600) manufactured by FEI], and a cross-section was prepared in a FIB processing at an accelerating voltage of 30 kV, and the cross-section was observed by SEM at an accelerating voltage of 2 kV. After observation, a cross-section was newly prepared at 20 nm of thickness in the depth direction of the sample in a FIB processing, and the cross-section was observed by SEM. In this way, a FIB processing at an interval of 20 nm and a cross-sectional SEM observation were repeated to obtain 100 shots or more of cross-sectional SEM images, and a position correction was carried out by means of an image analysis software (Avizo ver. 6.0 manufactured by Visualization Sciences Group) to obtain a continuous slice image. Scales of all of the three axes were set at 20 nm/pix.

As to the obtained continuous slice image, three-dimensional quantitative analysis of an alumina particle was carried out to calculate a three-dimensional particle unevenness. In the three-dimensional quantitative analysis, a quantitative analysis software: TRI/3D-PRT (manufactured by RATOC SYSTEM ENGINEERING) was used.

In the three-dimensional quantitative analysis, the continuous slice image was first opened on TRI/3D-PRT, and a median filter was applied to carry out noise removal. Subsequently, after three-dimensionally isolating particles were each identified and labeled, particles broken by the edge of a measurement field were deleted.

From the particles remaining without the deletion by the aforementioned processing, particle volume V, longest particle diameter La, medium particle diameter Lb and shortest particle diameter Lc of any particle were determined, and a three-dimensional particle unevenness was calculated according to the above formula (1).

An average three-dimensional particle unevenness was obtained as an average value of particle unevenness of 100 or more of the particles obtained in this way.

(Preparation of Alumina-Coated Film for Evaluation)

As a sample film for evaluating an average pore radius and porosity of an alumina porous membrane, an alumina-coated film for evaluation was prepared.

At first, after an α-alumina powder (100 parts by weight), pure water (41.8 parts by weight) and ammonium salt of a polycarboxylic acid (0.5 parts by weight) were dispersed by ultrasonic wave, rubber latex of styrene-butadiene copolymer (SBR) (5 parts by weight, latex particle diameter: 0.17 µm) was added, and ultrasonic dispersion was again carried out to prepare a slurry.

Subsequently, the slurry was coated on a PET film (manufactured by Teijin DuPont Films, X-71) by means of a test coater (manufactured by YASUI SEIKI: CAD150II) (applicator gap: 15 µm, tape feed speed: 1 m/min, drying temperature: 80° C.) to obtain an alumina-coated film for evaluation where an alumina porous membrane was formed on the PET film.

(Alumina Porous Membrane Pore Volume)

An alumina porous membrane pore volume was calculated by the following procedure.

An alumina-coated film for evaluation and an alumina-uncoated PET film were cut into sheets of 20 mm×50 mm, and their pore distributions were each measured by means of a mercury porosimeter (Auto Pore III 9430 manufactured by MICROMERITICS), and a pore volume of the alumina porous membrane was determined from each of the pore volumes according to the following formula:

Alumina porous membrane pore volume (mL/g)= [(Alumina-coated film pore volume×alumina porous membrane weight)−(film pore volume× film weight)]/(alumina porous membrane weight).

Weight of an alumina porous membrane was determined from a weight difference between a film before and after being coated with an alumina powder.

(Average Pore Radius of Alumina Porous Membrane)

A pore volume of alumina-coated film was calculated by subtracting pore volume of an alumina-uncoated film from pore volume of an alumina-coated film. From a pore volume in a range of from 0.01 µm to 1 µm in the pore volume of the obtained alumina porous membrane, an average pore radius (a pore radius corresponding to 50% cumulative pore volume of an alumina porous membrane) was determined.

(Porosity of Alumina Porous Membrane)

Porosity of the alumina porous membrane was determined according to the following formula using a pore volume where a pore radius of the α-alumina porous membrane is in a range of from 0.1 µm to 1 µm.

Porosity of alumina porous membrane (%)=[1−(density of alumina porous membrane/true specific gravity of constitution material)]×100, Density of alumina porous membrane (g/mL)=1/ [pore volume of alumina porous membrane+(1/ true specific gravity of constitution material)].

Example 1

At first, aluminum isopropoxide prepared with aluminum having a purity of 99.99% as a raw material was hydrolyzed with water to obtain aluminum hydroxide in the form of a slurry, and this was dried to obtain aluminum hydroxide in the form of a dry powder having an untamped density of 0.1 g/cm$^3$.

Additionally, this aluminum hydroxide in the form of a dry powder was retained at 1220° C. for four hours in a gas furnace for calcination by burning of propane gas or the like, and was pulverized by means of a jet mill to obtain an α-alumina powder.

Impurity amounts of the obtained α-alumina powder were as follows; Si=7 ppm, Fe=5 ppm, Cu=1 ppm or less, Na=2 ppm and Mg=1 ppm or less, and an oxide purity based on alumina was 99.99% by weight or higher. In addition, a BET specific surface area was 4.3 m$^2$/g, an average particle diameter was 0.57 µm, a content of a coarse particle with 10 µm or more was 3 ppm or less, [(d100−d5)/average particle diameter] was 4.6, an average three-dimensional particle unevenness for 128 particles was 3.7, and a proportion of particles having a three-dimensional particle unevenness of higher than 4.0 on the basis on the number of entire particles of the α-alumina powder was 34.4%.

Additionally, an α-alumina slurry was prepared from the aforementioned α-alumina powder in the aforementioned method, and was coated on a PET film to prepare an alumina-coated film for evaluation, the alumina-coated film having a surface on which an alumina porous membrane was formed. The α-alumina porous membrane had an average pore radius of 0.10 µm and porosity of 37%, and had a sufficient pore radius and porosity for lithium ion permeation.

Comparative Example 1

Aluminum hydroxide in the form of a dry powder obtained in the same way as in Example 1 was retained at 1205° C. for two hours for calcination and pulverized by means of a vibration mill to obtain an α-alumina powder.

Impurity amounts of the obtained α-alumina powder were as follows; Si=12 ppm, Fe=5 ppm, Cu=1 ppm or less, Na=2 ppm and Mg=2 ppm, and an oxide purity based on alumina was 99.99% by weight or higher. In addition, a BET specific surface area was 10 m$^2$/g, average particle diameter was 0.25 µm, a content of a coarse particle with 10 µm or more was 1000 ppm, [(d100−d5)/average particle diameter] was 69, an average three-dimensional particle unevenness for 128 particles was 2.8, and a proportion of particles having a three-dimensional particle unevenness of higher than 4.0 on the basis of the number of entire particles of the α-alumina powder was 3.8%.

Additionally, an α-alumina slurry prepared from the aforementioned α-alumina powder in the aforementioned method was coated on a PET film to prepare an alumina-coated film for evaluation, the alumina-coated film having a surface on which an alumina porous membrane was formed. The α-alumina porous membrane had an average pore radius of 0.04 µm and porosity of 28%, and did not have a sufficient pore radius and porosity for lithium ion permeation.

INDUSTRIAL APPLICABILITY

The inorganic oxide powder of the present invention can provide an inorganic oxide porous membrane which is superior in lithium ion conductivity and has high porosity in use for a lithium ion secondary battery. The inorganic oxide porous membrane is superior in lithium ion conductivity, and a lithium ion secondary battery having the inorganic oxide porous membrane on at least one surface of a positive electrode, a negative electrode or separator is a secondary battery superior in a load characteristic, and therefore, it is industrially prospective.

The invention claimed is:

1. An inorganic oxide powder for use in forming an inorganic oxide porous membrane having insulation performance on at least one surface of a positive electrode, a negative electrode and a separator which constitute a lithium ion secondary battery, characterized in that the powder has
   1) an oxide purity of 90% by weight or higher,
   2) an average particle diameter of 1 μm or less,
   3) an average three-dimensional particle unevenness of 3.0 or higher,
   wherein the powder contains 5% or more of particles having a three-dimensional particle unevenness of higher than 4.0, based on the number of entire particles constituting the inorganic oxide powder; and
   wherein when 5% cumulative percentage and 100% cumulative percentage on a mass basis from the smaller side of a particle diameter distribution are d5 and d100, respectively, [(d100−d5)/average particle diameter] is 5 or less.

2. The inorganic oxide powder according to claim 1, wherein the powder has a BET specific surface area of 1 $m^2/g$ or more and 20 $m^2/g$ or less.

3. The inorganic oxide powder according to claim 1, wherein the inorganic oxide is α-alumina.

4. An inorganic oxide slurry characterized in that the slurry contains the inorganic oxide powder as defined in claim 1, a binder and a solvent.

5. A process for producing a lithium ion secondary battery, characterized in that the process comprises a step of coating the inorganic oxide slurry as defined in claim 4 on a surface of a positive electrode and/or a negative electrode, followed by drying the slurry to form an inorganic oxide porous membrane.

6. A process for producing a lithium ion secondary battery, characterized in that the process comprises a step of coating the inorganic oxide slurry as defined in claim 4 on a surface of a separator, followed by drying the slurry to form an inorganic oxide porous membrane.

\* \* \* \* \*